Feb. 11, 1958 W. B. RETZ 2,823,041
CHUCKING MEANS
Filed Oct. 3, 1955 5 Sheets-Sheet 1
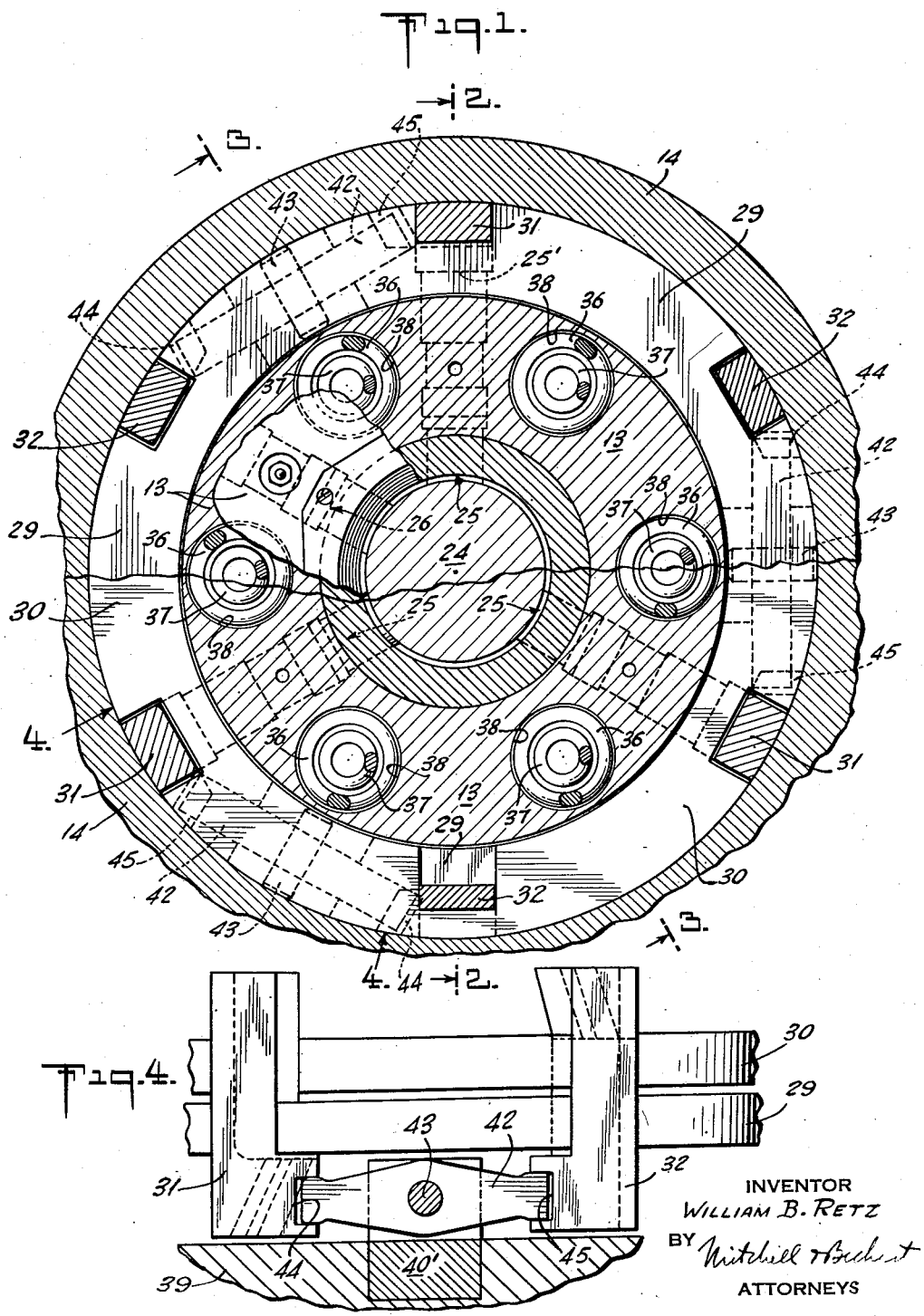
INVENTOR
WILLIAM B. RETZ
BY Mitchell Bechert
ATTORNEYS

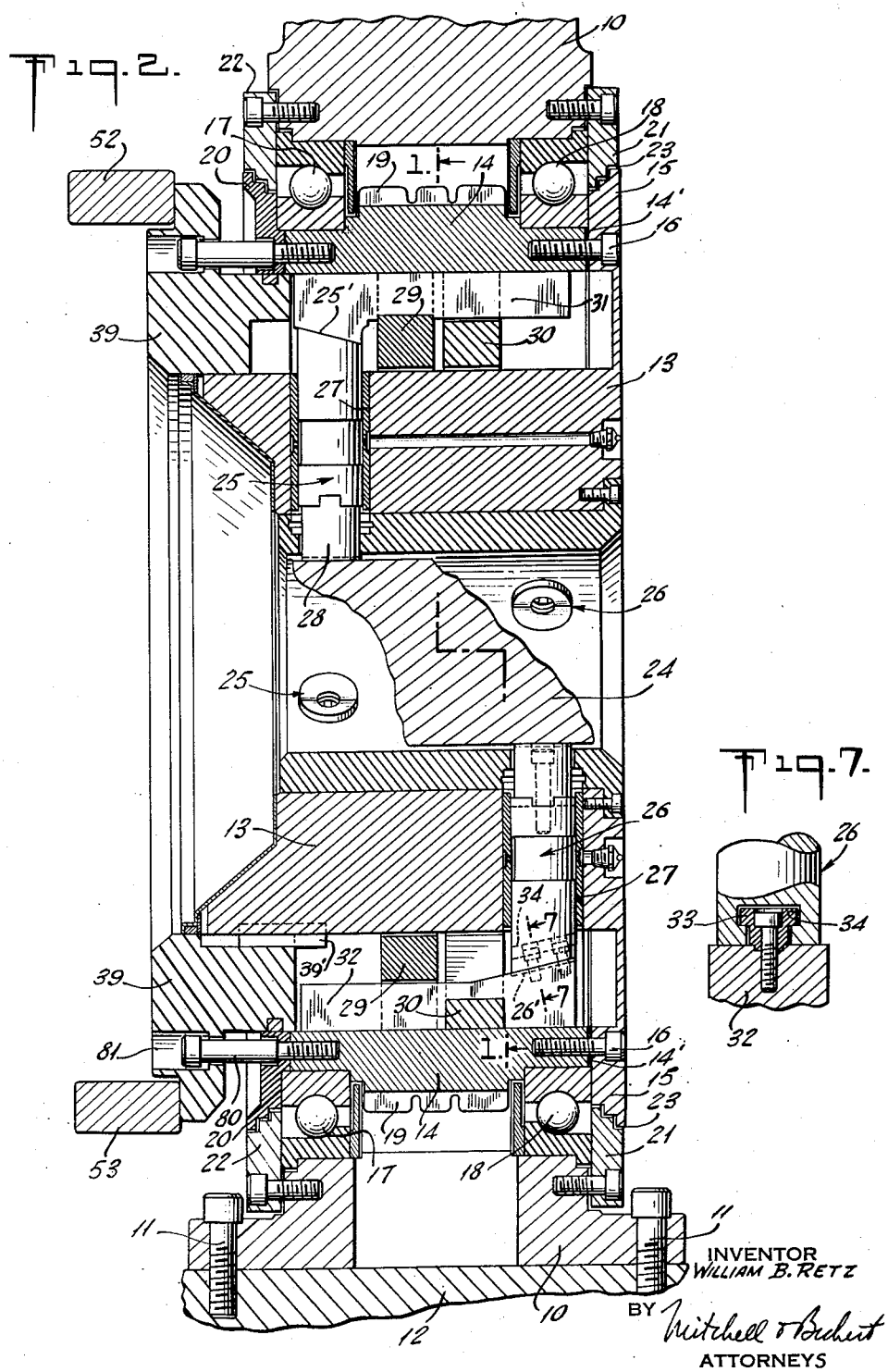

Feb. 11, 1958 W. B. RETZ 2,823,041
CHUCKING MEANS
Filed Oct. 3, 1955 5 Sheets-Sheet 3
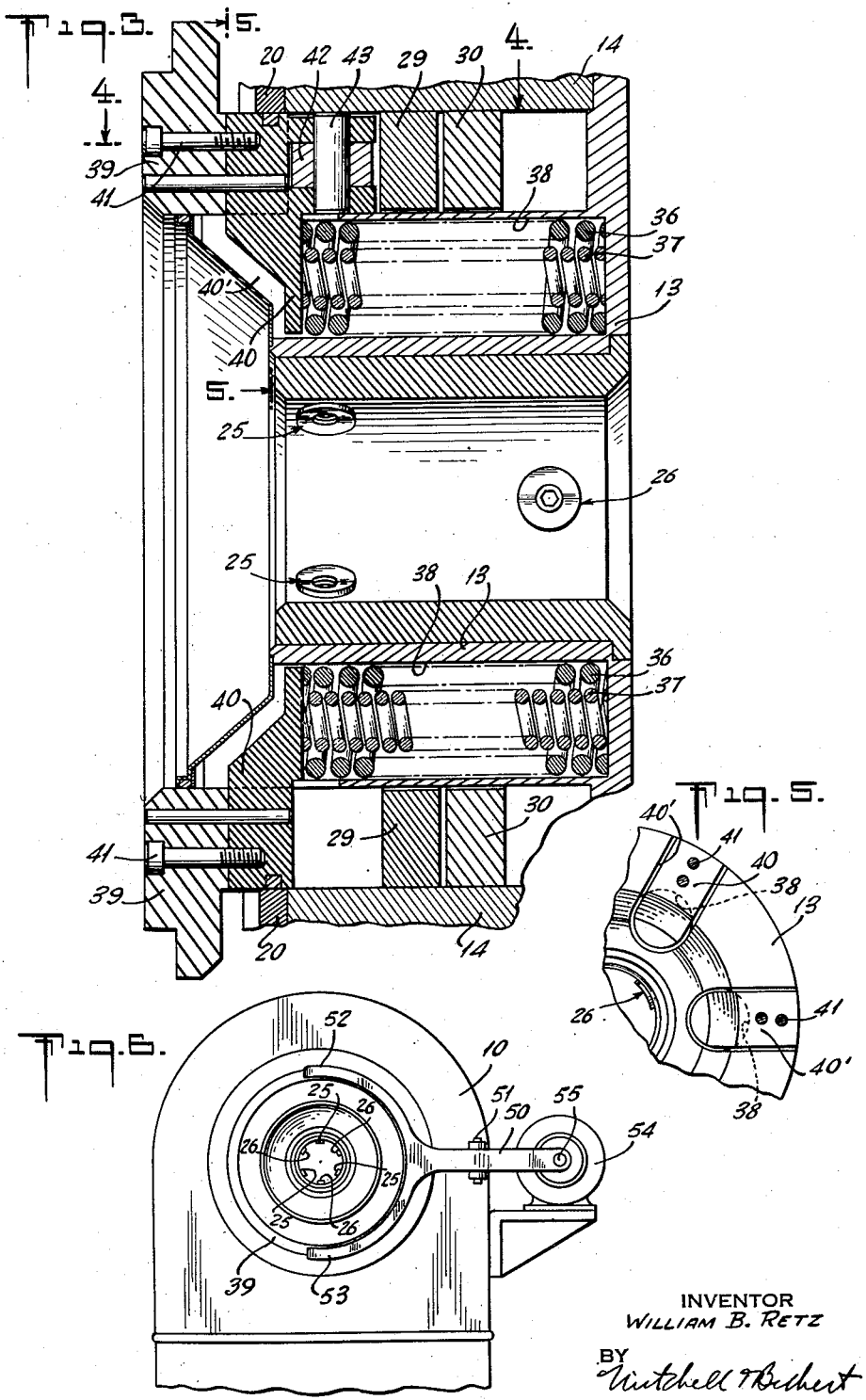
INVENTOR
WILLIAM B. RETZ
BY
Mitchell Bechert
ATTORNEYS Feb. 11, 1958 W. B. RETZ 2,823,041
CHUCKING MEANS
Filed Oct. 3, 1955 5 Sheets-Sheet 4

INVENTOR
WILLIAM B. RETZ
BY Mitchell Bechert
ATTORNEYS

Feb. 11, 1958   W. B. RETZ   2,823,041
CHUCKING MEANS
Filed Oct. 3, 1955   5 Sheets-Sheet 5

INVENTOR
WILLIAM B. RETZ
BY
Mitchell & Bechert
ATTORNEYS

United States Patent Office 2,823,041
Patented Feb. 11, 1958

2,823,041

CHUCKING MEANS

William B. Retz, Plainville, Conn., assignor to The New Britain Machine Company, New Britain, Conn., a corporation of Connecticut Application October 3, 1955, Serial No. 538,099

21 Claims. (Cl. 279—66)

My invention relates to chucking means and is particularly concerned with center-drive lathes, wherein work must be supported in a minimum of axial length, and yet provide positive retention of the work against tool-cutting forces applied at both axial ends of the chuck. This invention incorporates improvements over the invention disclosed in my copending application Serial No. 416,780, filed March 17, 1954, now Patent No. 2,771,296.

It is an object of the invention to provide improved chucking means of the character indicated.

It is another object to provide improved chucking means wherein two axially spaced sets of jaws are actuated in tandem.

Another object is to provide improved chucking means employing differential means in the application of actuating forces, so as to provide equal application of jaw force at each of a plurality of locations on the work.

It is also an object to provide chucking means of the character indicated which may be fully self-contained within an annular chuck body in such manner that no residual, externally derived, actuating force need be maintained on any part of the chuck during rotation thereof, thereby avoiding residual load on chuck or spindle bearings and on the chuck housing.

Still another object is to meet the above objects with a construction in which externally applied chuck-opening forces involve contact with the chuck only when the chuck is to be opened, so that during rotation there may be no engagement with the chuck-opening mechanism.

It is a specific object to provide a spring-actuated center-drive chuck which will automatically compensate for variations in work-piece diameter.

A still further object is to meet the above objects with a construction in which anti-friction thrust bearings are not required in the chuck-opening mechanism.

It is another specific object to meet the above objects in a two-row chuck, that is, a chuck having two sets of angularly spaced jaws, with means for differentially actuating the jaws in the respective sets or rows, so as to minimize possible inequality in the application of chucking forces, as when stock diameter may fluctuate as a function of length.

It is a general object to meet the above objects with a structure providing maximum resistance to eccentric location of a chucked piece of work, and at the same time providing maximum tool access at both axial ends of the chucking means, all within a minimum of axial length.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a vertical cross-section through chucking means incorporating features of the invention, the section being taken in two axially spaced planes, as indicated by the line 1—1 in Fig. 2;

Fig. 2 is a longitudinal sectional view taken in the vertical plane 2—2 of Fig. 1;

Fig. 3 is a fragmentary sectional view in the plane 3—3 of Fig. 1;

Fig. 4 is an enlarged fragmentary view of certain of the actuating parts of the chucking means of Fig. 1, as viewed generally along the line 4—4 of Fig. 1;

Fig. 5 is a fragmentary sectional view taken in the plane 5—5 of Fig. 3 and on a reduced scale;

Fig. 6 is a left-end view of the mounted chuck and showing, on a reduced scale, the externally applied chuck-opening mechanism;

Fig. 7 is an enlarged fragmentary sectional view in the plane 7—7 of Fig. 2;

Figure 8:
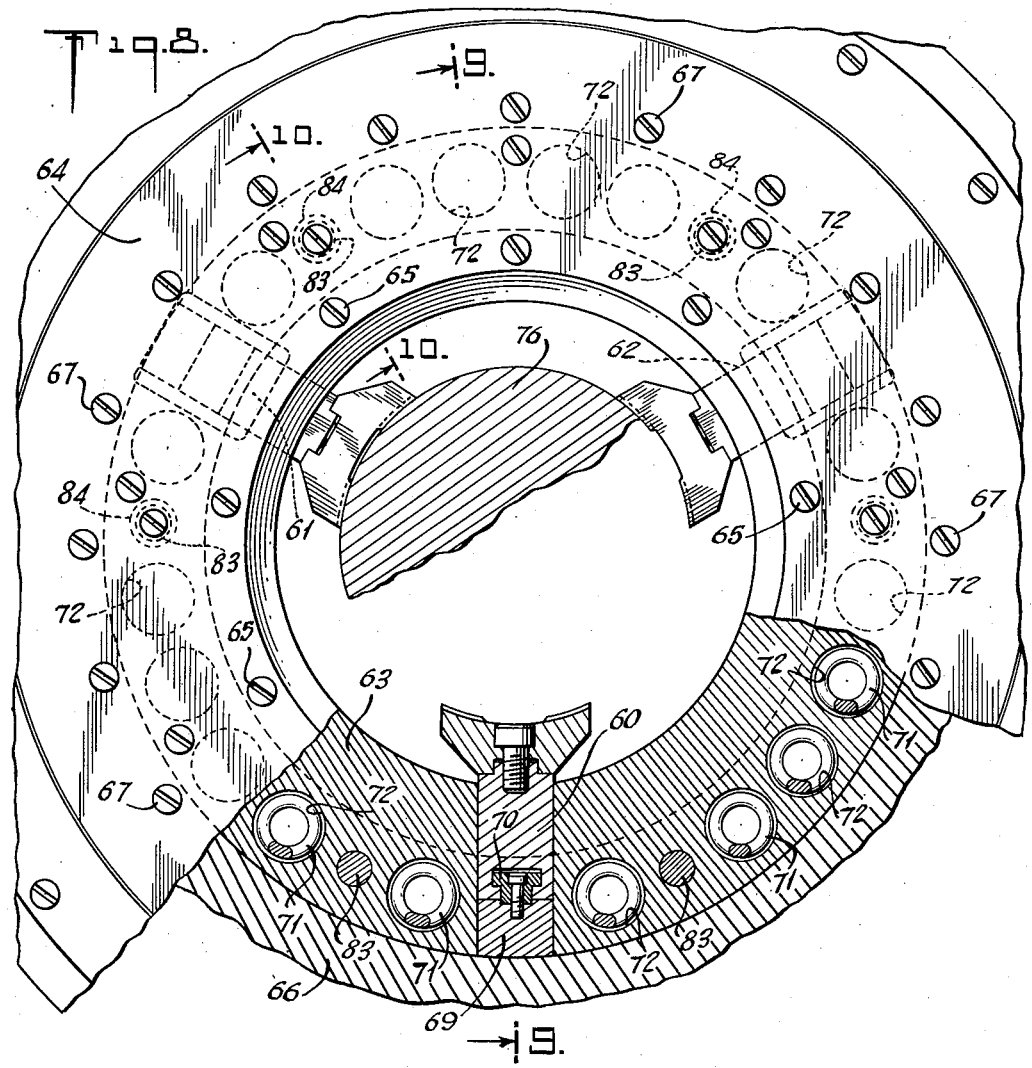
Fig. 8 is an end view of another center-drive chuck, representing a modification of the form of Figs. 1 to 7 and partly broken away and shown in section in the plane 8—8 of Fig. 9.

Briefly stated, my invention contemplates improved chucking means for supporting a work piece or a length of stock in a central part thereof so that work operations may proceed simultaneously on both ends of the length of stock. The chucking means comprises essentially a body with a plurality of angularly spaced jaws or sets of jaws so as to clamp the work at one or more axially spaced locations. Common actuating means for all jaws is axially shiftable and includes separate connections to a separate cam for each jaw, so that the jaws are actuated in response to axial displacement of the common actuator. Preloaded springs contained within the body of the chuck load the common actuator in the direction to produce jaw actuation, that is, to establish a setting of the jaws on the work. The invention is described in connection with work-rotating chucks, and therefore the particular structure incorporates certain further features of novelty occasioned by rotation. In one form, there are two axially spaced sets of angularly staggered jaws, and the common actuator includes differential connections to the jaws of each set. In the other form, there is one set of angularly spaced jaws, and the common actuator is directly tied to the cams for all jaws.

Referring particularly to Figs. 1 to 7 of the drawings, my invention is shown in application to work-rotating chucking means contained within a stationary housing 10 (Figs. 2 and 6), bolted at 11 to frame means 12 which may be the bed of a so-called center-drive lathe or the like. The chucking means itself comprises essentially a body with an inner annular member 13 secured to an outer annular member 14, so as to define therebetween an annular space for accommodation of actuating parts. The connection between these two members 13—14, so as to complete the essential body structure, may be made by means of an end plate secured to both members 13—14, but I have shown an outwardly extending flange 15 formed as a part of the inner-body member 13 and secured by bolts 16 to the outer-body member 14.

The chuck body may be supported on spaced antifriction bearings 17—18, preferably preloaded against each other to assure a tight non-eccentric support of the work, and the outer surface of the outer-body member may be formed with means such as sprocket teeth 19 for direct connection to a drive motor (not shown). At the unflanged end of the outer-body member 14, a retaining ring 20 may be bolted by means 80 (to be described later in more detail); and to provide the desired preload on the bearings 17—18, means such as shims may be accommodated at the interfit between rings 14—20 or at 14' between ring 14 and flange 15, as will be understood.

If the ring 20 and the flange 15 extend far enough radially outwardly, they may provide adequate flinger and seal functions for the bearings; in the form shown, I show end-retaining rings 21—22 for the outer bearing rings, said rings 21—22 being so formed as to cooperate with ring 20 and with flange 15 to develop therebetween labyrinthian-seal passages, as at 23.

In the form represented by Figs. 1 to 7, the chuck body is provided with means for supporting axially and angularly spaced jaws defining two axially spaced sets of jaws. The jaws of the respective sets are differentially actuated, and means contained within the body serve to set and to hold a set condition of the chuck on a piece 24 of bar stock. Each set of jaws is shown to include three equally angularly spaced jaw bodies. The jaws 25 serve what I shall term the front set, and the jaws 26 serve the rear set. The jaws 25—26 of the respective sets are equally angularly staggered. Each jaw is guided in a bushing 27 fitted in the body 13 and carries a false jaw 28 of a size and nature for best engagement with the stock size to be chucked. The jaws are actuated by axially movable mechanism, and the motion of this mechanism is transmitted to the jaws by way of inclined wedge or cam surfaces 25' for the jaws 25, and 26' for the jaws 26. For any particular jaw actuation, that is, for chucking as distinguished from unchucking, a single axial direction of movement of the actuating mechanism accomplishes the desired movement of all jaws 25—26. For this reason, all cam slopes 25'—26' may be said to slope or converge towards the chuck axis in the same direction.

The axially shiftable actuating mechanism includes a separate ring for each set of jaws, the ring 29 being associated with the front set, and the ring 30 with the rear set. Ring 29 may thus carry a plurality of angularly spaced actuator bars 31 reacting upon and slidable along the bore of the outer-body ring 14. In like manner, the ring 30 may carry a plurality of actuator bars 32 also reacting against and slidable along the bore of the outer-body member 14. The actuator bars 31—32 are appropriately formed for cam engagement at 25'—26', respectively, with the jaws 25—26; for the case of engagement 26' in Fig. 2, and as shown in greater detail in Fig. 7, the preferred engagement will be seen to include a dovetail member 33 carried by the actuator 32 and engaging a suitably inclined dovetail slot 34 in the jaw 26.

The front and rear actuator rings 29—30 are, in the form shown, differentially actuated and, in accordance with the present invention, this actuating mechanism is self-contained within the body of the chuck and utilizes preloaded compressed springs. Since the jaws 25—26 are equally angularly staggered, I find it convenient to dispose the compression springs 36—37 within axial bores 38 (Figs. 1, 3, and 5) in the body 13, said bores being provided in the spaces between radial guide bores for the jaws 25—26. Utmost spring force is developed, and flexible selection of spring force is available, by providing springs in multiple and concentrically disposed, as for the case of the springs 36—37. Each set of springs 36—37 reacts against the body 13 at the bottom of the bore 38, and spring forces are uniformly transmitted to the differential actuating means through the intermediary of an externally exposed actuating ring 39 (Figs. 2, 3, 4, and 6). Ring 39 is axially slidable on the cylindrical outer surface of inner-body member 13 and is shown keyed thereto at 39'. Since ring 39 has a bore of nominal diameter substantially greater than the bore of the remainder of the chuck jaw, I have provided abutment lugs 40, bolted at 41 to the ring 39, and projecting radially inwardly (through radial recesses or slots 40' in body member 13) in alignment with the respective sets of springs in order to receive all spring forces.

In the form shown, the mechanism for differentially transmitting forces from the ring 39 to the front and rear actuator rings 29—30 resembles that described in my said copending application. Thus, three differential levers or whiffle trees 42 (Figs. 1, 3, and 4) may be provided in equally spaced disposition about the chuck axis, each such lever being disposed between adjacent actuator bars 31—32 for the front and rear jaw sets. The lever 42 is shown pivoted on a pin 43 carried by one of the thrust lugs 40 for receiving spring forces, and this type of suspension is provided in multiple for every other thrust lug 40. The ends of the differential lever 42 are shown engaged in grooves 44—45 in adjacent jaw-actuator bars 31—32.

With the parts thus far described, and with the springs 36—37 preloaded in compression, the actuator ring 39 is continuously urged to the left in the sense of Figs. 2 and 3. Displacement to the left is accompanied by corresponding displacement of the pivots 43 for the differential members 42, and all actuator bars 31—32 will be drawn to the left so as to cam jaws 25—26 radially inwardly. Because the actuating mechanism involves differential application of forces as between the front and rear sets of jaws, the jaw grip will be uniformly divided between the front and rear sets, regardless of differences in diameter of the stock at the spaced axial locations of jaw grip. Thus, the device will securely hold the work, solely through internally contained mechanism, and no external non-rotating members are required for the maintenance of a secure grip on the stock during rotation.

When the work has been performed on the stock and drive to the chuck has been disconnected, chuck opening may be effected through external non-rotating mechanism. Such mechanism may resemble that employed for chucking in said copending application, and in Fig. 6 is shown to include a chuck-opening lever 50, pivoted at 51 to the stationary chuck housing 10 and having forked arms 52—53 at the chuck-engaging end for actuating abutment with the externally exposed actuating ring 39. In the form shown, a hydraulic or pneumatic mechanism 54 engages the other end of lever 50 at 55 when necessary to open the chuck and, in so doing, displaces ring 39 to the right in the sense of Figs. 2 and 3, in a further compression of the springs 36—37. This movement releases all hold of jaws 25—26 on the stock and positively retracts the same out of engagement with the work.

When the new piece of stock has been inserted, the mechanism 54 is reversed, and springs 36—37 uniformly drive all jaws into chucking relation with the work. Also, the forked ends 52—53 of lever 50 are retracted out of possible contact with ring 39, and thus free of any rotated parts of the chuck.

Figure 10:
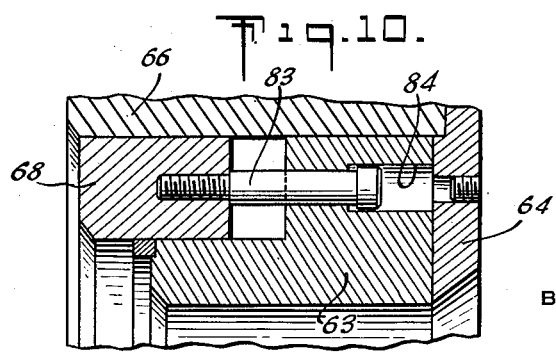
Fig. 10 is a fragmentary sectional view in the plane 10—10 of Fig. 8.
Figure 9:
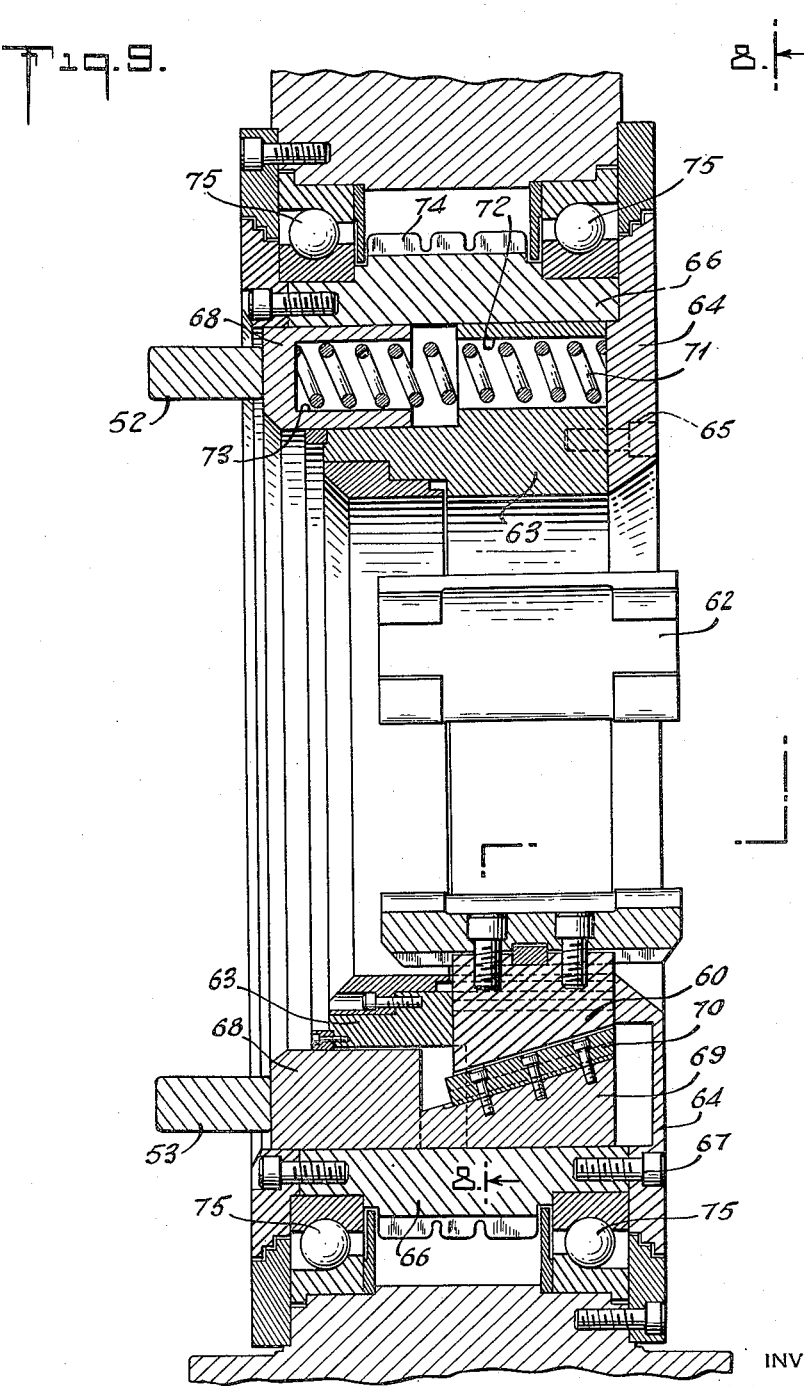
Fig. 9 is a sectional view taken along the lines 9—9 of Fig. 8.

The arrangement of Figs. 8, 9, and 10 involves again a chuck for use on center-drive lathes, and internally contained, preloaded springs serve to apply the necessary force for chuck actuation. The essential difference between the chuck of Figs. 8, 9, and 10 and that described for Figs. 1 to 7 is that the jaws are provided as a single set, equally angularly spaced in essentially the same radial plane. Thus, jaw bodies 60—61—62 may be gluided in suitable bores in a ring-shaped chuck-body member 63. The jaw bodies are shown as rectangular and the bores are of similar configuration, being defined between radial grooves facing to the right in the sense of Fig. 9 and closed by an end plate or flange 64, bolted at 65 to the body member 63. The body is completed by an outer body member 66, bolted at 67 to the flange 64, and providing at its bore an elongated surface to sustain cam-reaction forces from the jaw-actuating mechanism.

All jaws are again actuated by axially shiftable mechanism including an externally exposed ring member 68 and associated actuator bars, projections or wedges 69. The engagement of jaws to actuator bars may again involve a dovetail-slot relation, employing a dovetail member 70 secured to the actuator bar or wedge 69, and riding a dovetail slot in the particular jaw. Spring forces for setting the jaws may be provided by symmetrically disposed, angularly spaced springs 71 contained within bores 72 in the body 63 and reacting between the flange member or plate 64 and the ring 68, at the bottom of corresponding bores 73 in ring 68. Drive mechanism 74 and anti-friction suspension 75 may be otherwise as described for the chuck of Figs. 1 to 7.

In operation, the spring force achieved through the plural springs 71 is delivered from a preloaded reference level and may be entirely adequate to securely apply all jaws uniformly to the work 76. No non-rotating contact need be maintained with the chuck during the performance of a work operation, and the same non-rotating chuck-opening mechanism including fork 52—53 may be employed as described for Figs. 1 to 7.

It will be seen that I have described a substantially improved chucking contsruction particularly useful for center-drive lathes. This mechanism avoids the encumbrance and substantial wear associated with the chuck of my said copending application, in that no contact is required between non-rotating and rotating parts during a working operation. The only contact required is for the purpose of chuck opening, and this of course takes place when the drive has been disconnected and the chuck brought to a halt.

When the mechanism is not in use and when no stock is available against which to set the jaws, I find it convenient to provide lost-motion abutment means whereby the chuck-opening mechanism may be left out of contact with the chuck and yet the jaws will be retained in substantially a desired position. In the form of Figs. 1 to 7, lost-motion retaining means takes the form of a plurality of angularly spaced bolts 80 (Fig. 2) secured in the body member 14 and having enlarged heads riding a countersunk bore 81 in the externally exposed ring member 39. The members 80 may be viewed as preloading means for the springs 36—37, but, in any event, the setting of this lost-motion mechanism should be such that, when the jaws have set upon the work, the enlarged heads of bolts 80 will be spaced from the bottom of the counterbores 81. In like manner, bolts 83 for the arrangement of Figs. 8 to 10 may be secured in the externally exposed ring member 68, for lost-motion engagement with the bottoms of counterbores 84 in the body member 63.

While I have described the invention in detail for the preferred forms illustrated, it will be understood that modifications may be made within the scope of the invention as defined in the claims which follow.

I claim:

1. Chucking means, comprising a body having a plurality of generally radially directed bores, separate chucking jaws guided for generally radial movement in said bores, first axially shiftable actuating means including cam means coacting with one of said jaws, second axially shiftable actuating means including cam means coacting with another of said jaws, both said cam means being inclined in the same sense with respect to the axis of said chucking means, means including a differential connection to both of said actuating means for actuating both said jaws with equalized force application, and spring means contained within said body and acting against said differential connection in the direction causing actuation of both said jaws.

2. Chucking means, comprising an annular body having an enlarged central bore for receiving a work piece to project from said bore beyond both ends of said body, said body also having a plurality of angularly spaced, generally radially directed jaws bores communicating with said central bore, separate chucking jaws guided for general radial movement in said bores, axially shiftable actuating means including separate cam means coacting with each of said jaws and including an annular member angularly interconnecting and spacing the cam means for said jaws, spring means contained within said body and acting on said annular member in a direction causing actuation of said jaws, and bearing means extending peripherally around said body for supporting the same to permit simultaneous working of both ends of the work piece.

3. Chucking means, comprising an annular body having an enlarged central bore for receiving a work piece to project from said bore beyond both ends of said body, means constituting the sole support of said body and located intermediate the axial ends thereof, whereby both the projecting ends of the work piece may be clear for simultaneous working, a plurality of angularly spaced generally radially directed jaw guides, separate chucking jaws guided for generally radial movement in said guides, an axially shiftable annular member within said body, separate cams carried by said member and coacting with said jaws, spring means contained within said body and acting on said member to displace the same axially, the slopes of said cams being such as to produce radially inward jaw action in response to the urging of said spring means.

4. Chucking means comprising an annular body having a plurality of angularly spaced generally radially directed bores, separate chucking jaws guided for generally radial movement in said bores, one of said bores being axially spaced from another of said bores, first axially shiftable actuating means including cam means coacting with one of said jaws, second axially shiftable actuating means including cam means coacting with another of said jaws, both said cam means being inclined in the same sense with respect to the axis of said chucking means, means including a differential connection to both of said actuating means for actuating both said jaws with equalized force application, said last-defined means including an annular axially shiftable ring carried by said body and connected to said differential connection, and spring means contained within said body and acting against said ring in the direction to actuate both said one and said other jaw in the radially inward direction.

5. Chucking means, comprising a body having a first set of generally radially directed bores and a second set of generally radially directed bores, said sets being axially spaced, separate jaws in said bores, a first plurality of actuating means including cam means cooperating with all jaws in said first set, a second plurality of actuating means including cam means cooperating with all jaws in said second set, and means including separate differential connections to corresponding axially spaced pairs of said actuating means for differentially applying chucking force to the corresponding axially spaced pairs of said chucking jaws, said last-defined means including an annular ring carried by said body and axially shiftable with respect thereto and connected to said differential connection, and spring means contained within said body and acting on said ring in the direction to produce jaw actuation.

6. Chucking means, comprising a body having a first set of generally radially directed bores and a second set of generally radially directed bores, said sets being axially spaced, separate jaws in said bores, a first plurality of actuating means including cam means cooperating with all jaws in said first set, a second plurality of actuating means including cam means cooperating with all jaws in said second set, and means including separate differential connections to corresponding axially spaced pairs of said actuating means for differentially applying chucking force to the corresponding axially spaced pairs of said chucking jaws, said last-defined means including an axially shiftable annular ring carried by said body and separately connected to each of said differential connections at angularly spaced locations, and a plurality of angularly spaced springs angularly interlaced with said jaws and carried by said body and acting against said ring in the direction to produce jaw actuation.

7. Chucking means according to claim 6, and including an axial lost-motion connection between said body and said ring for limiting axial displacement of said ring in response to said spring means.

8. Chucking means, comprising a body having a first set of radially directed bores in a first radial plane and having a second set of radially directed bores in a second radial plane spaced from said first radial plane along a chucking axis, separate jaws in said bores, said body having a central work-receiving bore into which said jaws project, a first actuator guided for axial movement with respect to said body and including cam means cooperating with all jaws in said first set, a second actuator guided for axial movement with respect to said body and including cam means cooperating with all jaws in said second set, means symmetrical about said axis for differentially applying actuating forces to said actuators, and a single axially shiftable actuator in actuating relation with said last-defined means, and spring means carried by said body and acting on said single actuator in the direction to produce actuation of said jaws.

9. Chucking means, comprising a body having a central work-receiving bore and having axially spaced sets of generally radially directed jaw-guiding bores, separate jaws guided in said bores, first actuating means comprising a ring axially shiftable with respect to said body and carrying separate cams for the separate jaws of said first set, a second ring carrying separate cams for the separate jaws of said second set, a chuck-actuating ring guided for axial displacement with respect to said body, means differentially connecting said last-defined ring in actuating relation with each of said first two above-mentioned rings, and spring means carried by said body and preloaded against said ring in the direction to produce actuation of said jaws.

10. Chucking means according to claim 9, in which said chuck-actuating ring is externally exposed, whereby external actuating forces may be applied against said ring and in opposition to the force of said spring means for relieving a chucked condition of said jaws.

11. Chucking means, comprising a body having a central work-receiving bore and having first and second angularly spaced generally radially directed jaw-guiding bores, separate jaws in said bores, said body further comprising a cylindrical reaction surface concentric with the work-receiving bore and overstanding both said jaw-guiding bores, a first jaw actuator extending longitudinally and slidably along said cylindrical surface and including cam means cooperating with one of said jaws to produce jaw actuation upon axial movement thereof, a second jaw actuator longitudinally slidable on said cylindrical surface and including cam means cooperating with the other of said jaws, a common actuator ring guided by said body for axial displacement and connected to both said jaw actuators, and spring means carried by said body and actuating said actuating ring in the direction to produce axial displacement of said ring corresponding to actuation of said jaws.

12. Chucking means according to claim 11, and including an axial lost-motion connection between said ring and said body for limiting axial movement in response to the force of said spring means.

13. Chucking means according to claim 11, in which the connection of said ring to both said actuators is a differential connection.

14. Chucking means according to claim 11, in which said connection between said actuators and said ring is in both cases direct.

15. Chucking means according to claim 11, and bearing means carried by said body for supporting said chucking means in rotation.

16. Chucking means according to claim 15, in which said bearing means comprises two axially spaced sets of antifriction bearings.

17. Chucking means according to claim 15, in which said bearing means comprises two axially spaced bearings in planes axially straddling said jaws.

18. Chucking means according to claim 15, in which said bearing means comprises two axially spaced bearings, and in which the outer surface of said body and between said bearings is formed for direct engagement with driving means for driving said chucking means in rotation.

19. Chucking means, comprising an inner body removably connected to an outer body and defining therebetween an annular space for actuating parts, said inner body having a central work-receiving bore and having first and second axially spaced sets of generally radially directed jaw-receiving bores, jaws in said bores, said outer body having an inner cylindrical guide surface, a first ring guided by said surface and including separate cams coacting with the jaws of one of said sets, a second ring guided by said surface and including separate cams coacting with the separate jaws of the other set, means differentially connecting said rings with regard to axial movement along said surface, a common ring guided for axial movement with respect to one of said inner and outer bodies and directly connected to said differential-connection means, and spring means contained within said body and acting between said body and said common ring in the direction to produce jaw actuation.

20. Chucking means according to claim 19, in which the jaws of one set are in angularly staggered relation with the jaws of the other set, whereby a jaw of one set may be said to be angularly adjacent a jaw of another set, to define paired jaws of both sets.

21. Chucking means according to claim 20, in which said differential connecting means comprises separate differential connections between said common ring and each said pair of jaws of both sets.

References Cited in the file of this patent

UNITED STATES PATENTS

| | | |
|---|---|---|
| 211,911 | Johnston | Feb. 4, 1879 |
| 1,867,266 | Johnson et al. | July 12, 1932 |